Dec. 9, 1958 E. STEINER 2,863,373
DEVICE FOR PRODUCING A ROOM-CLOSING AIR CURTAIN
Filed Oct. 29, 1954 2 Sheets-Sheet 1
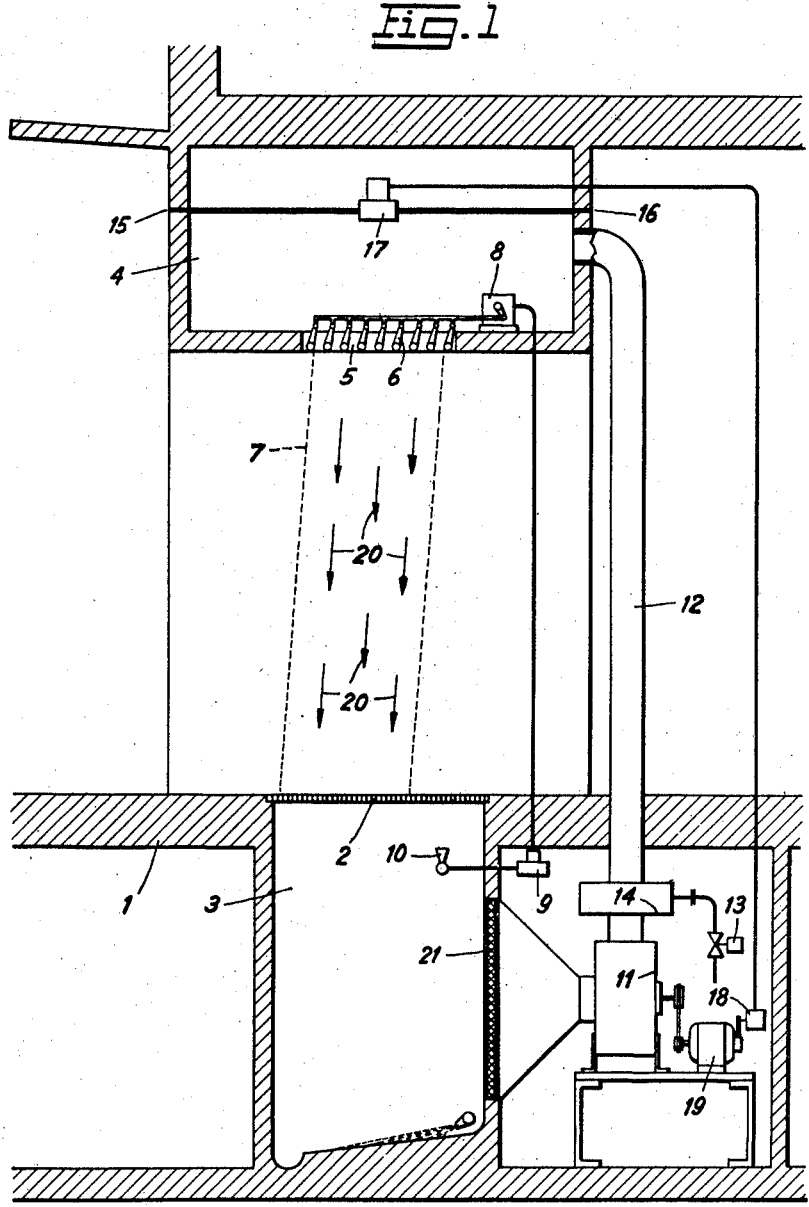
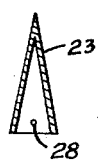
INVENTOR:
ERNST STEINER
BY K.A. [signature]
ATTORNEY.

Dec. 9, 1958  E. STEINER  2,863,373
DEVICE FOR PRODUCING A ROOM-CLOSING AIR CURTAIN
Filed Oct. 29, 1954  2 Sheets-Sheet 2

INVENTOR:
ERNST STEINER
BY K.B. [signature]
ATTORNEY.

United States Patent Office 2,863,373
Patented Dec. 9, 1958

2,863,373

DEVICE FOR PRODUCING A ROOM-CLOSING AIR CURTAIN

Ernst Steiner, Zurich, Switzerland, assignor to Sifrag Spezialapparatebau & Ingenieurbureau Frei A. G., Bern, Switzerland Application October 29, 1954, Serial No. 465,680

12 Claims. (Cl. 98—36)

The present invention relates to a device for producing a room-closing air-curtain of the known kind which is used instead of doors e. g. at the customer's entries and exits of warehouses. Such devices generally comprise an air outlet chamber arranged above the entry or exit and an air inlet chamber arranged beneath the entry or exit. The air-curtain is generally produced by fans or the like.

The invention now primarily consists in the provision of means for controlling the air-curtain. In one form of the invention these means comprises an adjustable air distributor. A differential pressure gauge is preferably provided, which measures the difference of the pressures in the rooms separated from each other by the air-curtain and which is arranged to act as a supplementary controlling means for the fan producing the air-curtain.

Figures 2, 3:
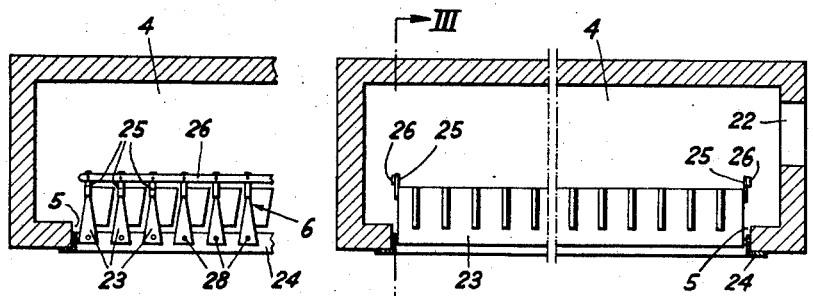
Figures 4, 5:
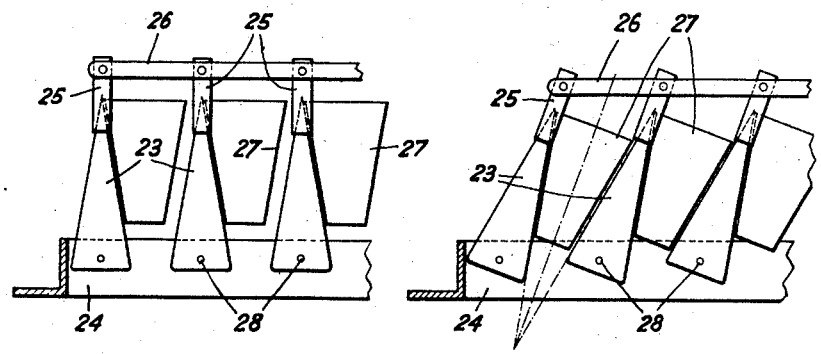
Figure 6:
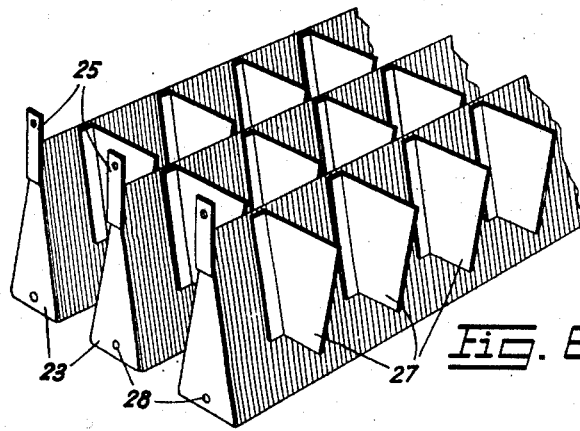

The invention will now be described in more details and by way of example with reference to the accompanying drawings, in which:

Fig. 1 is a diagrammatic vertical sectional view of a device for producing a room-closing air-curtain; the room to be closed from the outer atmosphere by means of the air-curtain is supposed to be located on the right side in this representation, Of Figs. 2 to 6 representing a preferred embodiment of the adjustable distributor, Fig. 2 is a sectional view in a vertical plane parallel to the main plane of the entry or exit to be closed by the curtain, Fig. 3 is a sectional view taken along line III—III of Fig. 2, Fig. 4 shows a detail of Fig. 2 on an enlarged scale, Fig. 5 is a view similar to Fig. 4, the movable member being, however, shown in another position, Fig. 6 is a perspective view of some members of the distributor, and Fig. 7 is a sectional view through one of the members of the distributor.

In the construction represented in Fig. 1, a floor 1 has a set-in grid 2 covering an air inlet chamber 3 located beneath an entry or exit. Above the latter is located an air outlet chamber 4 having an outlet opening 5 in which there is arranged an adjustable distributor 6 for an air-curtain 7. The distributor 6 is operatively connected by means of a servo-motor 8 to a control mechanism 9 which in turn is connected to a pressure gauge 10. The flow of air forming the air-curtain is produced by a fan 11 which draws the air from the inlet chamber 3 and delivers it to the outlet chamber 4 through a pipe 12. The air thus flows in a closed circuit comprising the air-curtain. A heater 14 controlled by a device 13 is arranged between sections of the pipe 12. The reference numerals 15 and 16 designate two feelers of a differential pressure gauge 17 controlling a servo-motor 18 which regulates an electric motor 19 driving the fan 11.

During operation, the motor 19 drives the fan 11 which then draws the air from the inlet chamber 3 through a strainer 21. The air delivered by the fan is heated at 14 before it reaches the outlet chamber 4; indeed a curtain of warm air is preferable to one formed by cold air.

The distributor 6 arranged in the opening 5 compels the air to flow in the direction of the arrows 20. The flow of air forms a curtain in the entry or exit which has substantial depth in the direction of traffic through the said entry or exit, being deeper in that direction than is the average person, and that curtain is then again drawn into the chamber 3 through the grid 2. Particles of dust and the like entering this chamber together with the air drop onto the bottom of the chamber, from where they are removed by a spray of water. As shown in Fig. 1, the curtain is outwardly inclined from top to bottom. The gauge 17 is sensible to any difference between the pressures existing in the spaces separated by the curtain and responds to such difference by so controlling the driving motor 19 of the fan 11 by means of the servo-motor 18, that it rotates faster and increases the velocity of the air forming the curtain to stabilise the location of the latter.

This regulation is, however, only active in a limited range. As a supplement to this first control means a second control means is used: the pressure gauge 10 is arranged at a place which is so chosen that during normal operation the air flow passes in front of it, but strikes it each time when the curtain is deflected inwardly by an outer perturbation accompanied by a sudden increase of the outer pressure. Each time when the gauge 10 is struck by the deflected air flow, the control mechanism 9 acts onto the servo-motor 8 which then regulates the distributor 6 so that the direction of the air flow is tilted outwardly.

Other combinations are possible. The pressure gauge 10 might be arranged to control the driving motor 19 of the fan, and the differential pressure gauge 17 might be arranged to control the distributor 6. Another alternative would consist in providing an arrangement with two pressure gauges combined with electric control means so designed that the air-curtain is always located between the said two pressure gauges.

Tests have shown that the adjustable distributor should preferably be constructed as an assembly of individual pivotable guide members 23 (Figs. 3 to 6), which take up the whole width of the air-curtain. In the embodiment represented the guide members are metallic hollow bodies the cross section of which is an isosceles triangle standing on its base. The angle at the vertex is about 20 degrees. All guide members are pivotally mounted on both ends in an angle iron 24. At the top each guide member has a projection 25 at least on one side. These projections are connected with one another by a rod 26, so that they may be pivoted in common. When the guide members assume the position shown in Fig. 4, the air curtain is vertical. When the guide members 23 are displaced by the control mechanism by means of the rod 26, as shown in Fig. 5, the air curtain, seen from the room to be closed thereby, is displaced outwards. Since the guide members are of triangular cross-section, the outlet opening is considerably diminished, so that, at a constant rotary speed of the fan, the air velocity in the curtain is increased, owing to which the curtain becomes more stable.

Since the ratio of pressure and speed is not the same at all points of the outlet chamber, the air flowing downwards tends to flow sidewards, so that it may be that the exit or entry is not closed completely.

This drawback may be removed by providing corresponding guide plates above or below the adjustable control mechanism. Thereby, however, the height required for the exit chamber is enlarged, which is usually undesirable or not possible at all.

In the embodiment shown each guide member is provided with several guide plates 27 perpendicular to the axis of rotation of this member. These plates have trapezoidal shape, so that they permit a limited tilting of the guide members 23, as especially shown in Fig. 5. They cause the air curtain to uniformly close the whole width of the room opening so that no "curtainless" corners can form. Their height is greater than half the height of the guide members 23. Their number and their distance from one another depend on the height and the size of the room opening to be closed by the air-curtain.

What I claim is:

1. A device that can direct air across an opening to form an air screen of substantial depth for filling a substantial portion of said opening and that comprises an air inlet chamber at one side of said opening, an air outlet chamber at the opposite side of said opening, an air passage extending from said air inlet chamber to said air outlet chamber, an air-moving element to draw air into said air inlet chamber and to move said air through said air passage to said air outlet chamber and across said opening to said air inlet chamber, a motor that drives said air-moving element to cause said air to enter said air inlet chamber and to pass through said air passage to said air outlet chamber and to move across said opening to said air inlet chamber, a plurality of closely adjacent, elongated elements that are spaced apart depthwise of said opening in the direction of traffic through said opening and that are adjacent the exit of said air outlet chamber, means movably mounting said elongated elements in said chamber exit, a mechanism for moving said elongated elements and thereby directing the air issuing from said air outlet chamber toward said air inlet chamber or outwardly of said opening, and a control device that varies the velocity of the said air issuing from said air outlet chamber and passing between said elongated elements, said control device normally maintaining the velocity of the said air issuing from said air outlet chamber at low value and said mechanism normally positioning said elongated elements for directing the said air issuing from said air outlet chamber toward said air inlet chamber, said control device increasing the velocity of the said air issuing from said air outlet chamber and said mechanism positioning said elongated elements for directing the said air issuing from said air outlet chamber outwardly of said opening whenever a wind capable of deflecting said air screen impinges upon said air screen.

2. A device that can direct air across an opening to form an air screen of substantial depth for filling a substantial portion of said opening and that comprises an air inlet chamber at one side of said opening, an air outlet chamber at the opposite side of said opening, an air passage extending from said air inlet chamber to said air outlet chamber, an air-moving element to draw air into said air inlet chamber and to move said air through said air passage to said air outlet chamber and across said opening to said air inlet chamber, a motor that drives said air-moving element to cause said air to enter said air inlet chamber and to pass through said air passage to said air outlet chamber and to move across said opening to said air inlet chamber, a plurality of closely adjacent, elongated elements that are spaced apart depthwise of said opening in the direction of traffic through said opening and that are adjacent the exit of said air outlet chamber, means movably mounting said elongated elements in said chamber exit, a mechanism for moving said elongated elements and thereby directing the air issuing from said air outlet chamber toward said air inlet chamber or outwardly of said opening, and a control device that varies the velocity of the said air issuing from said air outlet chamber and passing between said elongated elements, said control device normally maintaining the velocity of the said air issuing from said air outlet chamber at low value and said mechanism normally positioning said elongated elements for directing the said air issuing from said air outlet chamber toward said air inlet chamber, said control device increasing the velocity of the said air issuing from said air outlet chamber and said mechanism positioning said elongated elements for directing the said air issuing from said air outlet chamber outwardly of said opening whenever a wind capable of deflecting said air screen impinges upon said air screen, said control device being responsive to the differences between the pressures exteriorly and interiorly of said air screen, said elongated elements responding to said mechanism to move and define air-guiding passages inclined outwardly of said opening.

3. A device that can direct air across an opening to form an air screen of substantial depth for filling a substantial portion of said opening and that comprises an air inlet chamber at one side of said opening, an air outlet chamber at the opposite side of said opening, an air passage extending from said air inlet chamber to said air outlet chamber, an air-moving element to draw air into said air inlet chamber and to move said air through said air passage to said air outlet chamber and across said opening to said air inlet chamber, a motor that drives said air-moving element to cause said air to enter said air inlet chamber and to pass through air passage to said air outlet chamber and to move across said opening to said air inlet chamber, a plurality of closely adjacent, elongated elements that are spaced apart depthwise of said opening in the direction of traffic through said opening and that are adjacent the exit of said air outlet chamber, means movably mounting said elongated elements in said chamber exit, a mechanism for moving said elongated elements and thereby directing the air issuing from said air outlet chamber toward said air inlet chamber or outwardly of said opening, and a control device that varies the velocity of the said air issuing from said air outlet chamber and passing between said elongated elements, said control device normally maintaining the velocity of the said air issuing from said air outlet chamber at low value and said mechanism normally positioning said elongated elements for directing the said air issuing from said air outlet chamber toward said air inlet chamber, said control device increasing the velocity of the said air issuing from said air outlet chamber and said mechanism positioning said elongated elements for directing the said air issuing from said air outlet chamber outwardly of said opening whenever a wind capable of deflecting said air screen impinges upon said air screen, said control device being responsive to inward deflections of said air screen, said elongated elements responding to said mechanism to move and define air-guiding passages inclined outwardly of said opening.

4. A device that can direct air across an opening to form an air screen of substantial depth for filling a substantial portion of said opening and that comprises an air inlet chamber at one side of said opening, an air outlet chamber at the opposite side of said opening, an air passage extending from said air inlet chamber to said air outlet chamber, an air-moving element to draw air into said air inlet chamber and to move said air through said air passage to said air outlet chamber and across said opening to said air inlet chamber, said air outlet chamber having an exit that is adjacent said opening and that extends depthwise of said opening in the direction of traffic through said opening to provide an air screen of substantial depth in the direction of traffic through said opening, a motor that drives said air-moving element to cause said air to enter said air inlet chamber and to pass through said air passage to said air outlet chamber and to move across said opening to said air inlet chamber, and a control device that varies the velocity of said air issuing from said air outlet chamber, said control device providing low velocity for the said air issuing from said air outlet chamber whenever there is no external wind impinging upon said air screen and providing higher velocity for the said air issuing from said air outlet chamber and thereby stablizing said air screen whenever a wind capable of deflecting said air screen impinges upon said air screen.

5. A device that can direct air across an opening to form an air screen of substantial depth for filling a substantial portion of said opening and that comprises an air inlet chamber at one side of said opening, an air outlet chamber at the opposite side of said opening, an air passage extending from said air inlet chamber to said air outlet chamber, an air-moving element to draw air into said air inlet chamber and to move said air through said air passage to said air outlet chamber and across said opening to said air inlet chamber, said air outlet chamber having an exit that is adjacent said opening and that extends depthwise of said opening in the direction of traffic through said opening to provide an air screen of substantial depth in the direction of traffic through said opening and being deeper than is the average person, a motor that drives said air-moving element to cause said air to enter said air inlet chamber and to pass through said air passage to said air outlet chamber and to move across said opening to said air inlet chamber, and a control device that varies the velocity of said air issuing from said air outlet chamber, said control device providing low velocity for the said air issuing from said air outlet chamber whenever there is no external wind impinging upon said air screen and providing higher velocity for the said air issuing from said air outlet chamber and thereby stabilizing said air screen whenever a wind capable of deflecting said air screen impinges upon said air screen, said control device being responsive to the differences between the pressures exteriorly and interiorly of said air screen to increase and decrease the velocity of the said air issuing from said air outlet chamber.

6. A device that can direct air across an opening to form an air screen of substantial depth for filling a substantial portion of said opening and that comprises an air inlet chamber at one side of said opening, an air outlet chamber at the opposite side of said opening, an air passage extending from said air inlet chamber to said air outlet chamber, an air-moving element to draw air into said air inlet chamber and to move said air through said air passage to said air outlet chamber and across said opening to said air inlet chamber, said air outlet chamber having an exit that is adjacent said opening and that extends depthwise of said opening in the direction of traffic through said opening to provide an air screen of substantial depth in the direction of traffic through said opening, a motor that drives said air-moving element to cause said air to enter said air inlet chamber and to pass through said air passage to said air outlet chamber and to move across said opening to said air inlet chamber, and a control device that varies the velocity of said air issuing from said air outlet chamber, said control device providing low velocity for the said air issuing from said air outlet chamber whenever there is no external wind impinging upon said air screen and providing higher velocity for the said air issuing from said air outlet chamber and thereby stablizing said air screen whenever a wind capable of deflecting said air screen impinges upon said air screen, said control device being responsive to inward deflections of said air screen to increase the velocity of the said air issuing from said air outlet chamber.

7. A device that can direct air across an opening to form an air screen of substantial depth for filling a substantial portion of said opening and that comprises an air inlet chamber at one side of said opening, an air outlet chamber at the opposite side of said opening, an air passage extending from said air inlet chamber to said air outlet chamber, an air-moving element to draw air into said air inlet chamber and to move said air through said air passage to said air outlet chamber and across said opening to said air inlet chamber, a motor that drives said air-moving element to cause said air to enter said air inlet chamber and to pass through said air passage to said air outlet chamber and to move across said opening to said air inlet chamber, a plurality of closely adjacent, elongated elements that are spaced apart depthwise of said opening in the direction of traffic through said opening and that are adjacent the exit of said air outlet chamber to provide a plurality of air streams of sufficient velocity to extend across said opening, means movably mounting said elongated elements in said chamber exit, and a mechanism for moving said elongated elements and thereby directing the air issuing from said air outlet chamber and passing between said elongated elements toward said air inlet chamber or outwardly of said opening, said mechanism normally positioning said elongated elements for directing the said air issuing from said air outlet chamber toward said air inlet chamber, said mechanism positioning said elongated elements for directing the said air issuing from said air outlet chamber outwardly of said opening whenever a wind capable of deflecting said air screen impinges upon said air screen.

8. A device that can direct air across an opening to form an air screen of substantial depth for filling a substantial portion of said opening and that comprises an air inlet chamber at one side of said opening, an air outlet chamber at the opposite side of said opening, an air passage extending from said air inlet chamber to said air outlet chamber, an air-moving element to draw air into said air inlet chamber and to move said air through said air passage to said air outlet chamber and across said opening to said air inlet chamber, a motor that drives said air-moving element to cause said air to enter said air inlet chamber and to pass through said air passage to said air outlet chamber and to move across said opening to said air inlet chamber, a plurality of closely adjacent, elongated elements that are spaced apart depthwise of said opening in the direction of traffic through said opening and that are adjacent the exit of said air outlet chamber to provide a plurality of air streams of sufficient velocity to extend across said opening, means movably mounting said elongated elements in said chamber exit, and a mechanism for moving said elongated elements and thereby directing the air issuing from said air outlet chamber and passing between said elongated elements toward said air inlet chamber or outwardly of said opening, said mechanism normally positioning said elongated elements for directing the said air issuing from said air outlet chamber toward said air inlet chamber, said mechanism positioning said elongated elements for directing the said air issuing from said air outlet chamber outwardly of said opening whenever a wind capable of deflecting said air screen impinges upon said air screen, said mechanism being responsive to the differences between the pressures exteriorly and interiorly of said air screen to move said elongated elements and thereby provide air passages between said elongated elements that incline outwardly of said opening.

9. A device that can direct air across an opening to form an air screen of substantial depth for filling a substantial portion of said opening and that comprises an air inlet chamber at one side of said opening, an air outlet chamber at the opposite side of said opening, an air passage extending from said air inlet chamber to said air outlet chamber, an air-moving element to draw air into said air inlet chamber and to move said air through said air passage to said air outlet chamber and across said opening to said air inlet chamber, a motor that drives said air-moving element to cause said air to enter said air inlet chamber and to pass through said air passage to said air outlet chamber and to move across said opening to said air inlet chamber, a plurality of closely adjacent, elongated elements that are spaced apart depthwise of said opening in the direction of traffic through said opening and that are adjacent the exit of said air outlet chamber, to provide a plurality of air streams of sufficient velocity to extend across said opening, means movably mounting said elongated elements in said chamber exit and a mechanism for moving said elongated elements and thereby directing the air issuing from said air outlet chamber and passing between said elongated elements toward said air inlet chamber or outwardly of said opening, said mechanism normally positioning said elongated elements for directing the said air issuing from said air outlet chamber toward said air inlet chamber, said mechanism positioning said elongated elements for directing the said air issuing from said air outlet chamber outwardly of said opening whenever a wind capable of deflecting said air screen impinges upon said air screen, said mechanism responding to inward deflections of said air screen to move said elongated elements and thereby provide air passages between said elongated elements that incline outwardly of said opening.

10. A device that can direct air across an opening to form an air screen of substantial depth for filling a substantial portion of said opening and that comprises an air inlet chamber at one side of said opening, an air outlet chamber at the opposite side of said opening, an air passage extending from said air inlet chamber to said air outlet chamber, an air-moving element to draw air into said air inlet chamber and to move said air through said air passage to said air outlet chamber and across opening to said air inlet chamber, said air outlet chamber having a large exit adjacent said opening, and a plurality of closely adjacent, elongated elements that are spaced apart depthwise of said opening in the direction of traffic through said opening and that are adjacent said exit with their leading edges confronting the interior of said air outlet chamber and with their trailing edges confronting said opening, the elongated side edges of said elongated elements defining a plurality of elongated passages for the air issuing from said exit of said air outlet chamber, said elongated elements being triangular in cross section with their apexes as the leading edges thereof and with their bases as the trailing edges thereof.

11. A device that can direct air across an opening to form an air screen of substantial depth for filling a substantial portion of said opening and that comprises an air inlet chamber at one side of said opening, an outlet chamber at the opposite side of said opening, an air passage extending from said air inlet chamber to said air outlet chamber, an air-moving element to draw air into said air inlet chamber and to move said air through said air passage to said air outlet chamber and across said opening to said air inlet chamber, said air outlet chamber having a large exit adjacent said opening, a plurality of closely adjacent, elongated elements that are spaced apart depthwise of said opening in the direction of traffic through said opening and that are adjacent said exit with their leading edges confronting the interior of said air outlet chamber and with their trailing edges confronting said opening, the elongated side edges of said elongated elements defining a plurality of elongated passages for the air issuing from said exit of said air outlet chamber, said elongated elements being triangular in cross section with their apexes as the leading edges thereof and with their bases as the trailing edges thereof, and a plurality of guide plates mounted on and carried by said elongated elements, said guide plates being disposed between said elongated elements, said guide plates being spaced along the lengths of said elongated elements, said guide plates being generally normal to said elongated elements, to limit movement of air lengthwise of said elongated elements.

12. A device that can direct air across an opening to form an air screen of substantial depth for filling a substantial portion of said opening and that comprises an air inlet chamber at one side of said opening, an air outlet chamber at the opposite side of said opening, an air passage extending from said air inlet chamber to said air outlet chamber, an air-moving element to draw air into said air inlet chamber and to move said air through said air passage to said air outlet chamber and across said opening to said air inlet chamber, said air outlet chamber having an exit that is adjacent said opening and that extends depthwise of said opening in the direction of traffic through said opening to provide an air screen of substantial depth in the direction of traffic through said opening, a motor that drives said air-moving element to cause said air to enter said air inlet chamber and to pass through said air passage to said air outlet chamber and to move across said opening to said air inlet chamber, a water spray for said air inlet chamber that is adapted to remove foreign matter carried into said air inlet chamber by said air screen, a drain to remove the water supplied by said water spray, and a control device that varies the velocity of said air issuing from said air outlet chamber, said control device providing low velocity for the said air issuing from said air outlet chamber whenever there is no external wind impinging upon said air screen and providing higher velocity for the said air issuing from said air outlet chamber and thereby stabilizing said air screen whenever a wind capable of deflecting said air screen impinges upon said air screen.

References Cited in the file of this patent

UNITED STATES PATENTS

| | | |
|---|---|---|
| 774,730 | Van Kannel | Nov. 8, 1904 |
| 1,279,993 | Cummings | Sept. 24, 1918 |
| 2,621,578 | Labus | Dec. 16, 1952 |

FOREIGN PATENTS

| | | |
|---|---|---|
| 307,257 | Switzerland | May 13, 1955 |